United States Patent
Saylor

(10) Patent No.: US 11,512,885 B2
(45) Date of Patent: Nov. 29, 2022

(54) VARIABLE SPEED DRIVE WITH SECONDARY WINDINGS

(71) Applicant: Johnson Controls Technology Company, Auburn Hills, MI (US)

(72) Inventor: David F. Saylor, York, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 817 days.

(21) Appl. No.: 16/338,974

(22) PCT Filed: Oct. 5, 2017

(86) PCT No.: PCT/US2017/055365
§ 371 (c)(1),
(2) Date: Apr. 2, 2019

(87) PCT Pub. No.: WO2018/067833
PCT Pub. Date: Apr. 12, 2018

(65) Prior Publication Data
US 2021/0281208 A1 Sep. 9, 2021

Related U.S. Application Data

(60) Provisional application No. 62/404,644, filed on Oct. 5, 2016.

(51) Int. Cl.
*F25B 49/02* (2006.01)
*H02P 5/74* (2006.01)
(Continued)

(52) U.S. Cl.
CPC ............ *F25B 49/025* (2013.01); *F04B 49/02* (2013.01); *F04B 49/06* (2013.01); *F04B 49/065* (2013.01);
(Continued)

(58) Field of Classification Search
CPC .. H02P 27/16; H02P 27/04; H02P 5/74; H02P 1/58; H02P 1/54; H02P 27/00;
(Continued)

(56) References Cited

U.S. PATENT DOCUMENTS 5,461,263 A 10/1995 Helfrich
7,508,160 B1 3/2009 Rudniski
(Continued)

FOREIGN PATENT DOCUMENTS

CN 101326408 A 12/2008
CN 101346595 A 1/2009
(Continued)

OTHER PUBLICATIONS

Taiwan Office Action and Search Report for TW Application No. 11020215420 dated Mar. 8, 2021, 13 pgs.
(Continued)

*Primary Examiner* — Peter J Bertheaud
(74) *Attorney, Agent, or Firm* — Fletcher Yoder, P.C.

(57) ABSTRACT

Embodiments of the present disclosure relate to a refrigeration system that includes a compressor configured to circulate refrigerant along a refrigerant loop, a motor configured to drive the compressor, and a variable speed drive coupled to the motor and configured to supply power to the motor. The variable speed drive includes a primary winding of a step down transformer coupled to an alternating current (AC) power source, a first secondary winding of the step down transformer, where the first secondary winding is configured to supply power at a variable supplied voltage to the motor when the motor operates below a threshold voltage, and a second secondary winding of the step down transformer, where the second secondary winding is configured to supply power at a fixed supplied voltage when the motor operates at or above the threshold voltage.

20 Claims, 2 Drawing Sheets

(51) Int. Cl.
| | |
|---|---|
| *H01F 30/04* | (2006.01) |
| *F04C 28/08* | (2006.01) |
| *F04B 49/20* | (2006.01) |
| *F04B 41/00* | (2006.01) |
| *H02P 27/04* | (2016.01) |
| *H02P 1/58* | (2006.01) |
| *F04C 28/02* | (2006.01) |
| *F04B 49/06* | (2006.01) |
| *F04B 49/02* | (2006.01) |
| *F04D 25/06* | (2006.01) |
| *F04D 15/00* | (2006.01) |
| *F04D 27/00* | (2006.01) |
| *F04D 27/02* | (2006.01) |
| *H02P 27/06* | (2006.01) |
| *H02P 27/00* | (2006.01) |
| *H02P 1/54* | (2006.01) |
| *F04B 35/04* | (2006.01) |
| *H02P 27/16* | (2006.01) |

(52) U.S. Cl.
CPC .......... *F04B 49/20* (2013.01); *F04C 28/02* (2013.01); *F04C 28/08* (2013.01); *F04D 15/0066* (2013.01); *F04D 25/06* (2013.01); *F04D 27/004* (2013.01); *F04D 27/0261* (2013.01); *F25B 49/022* (2013.01); *H01F 30/04* (2013.01); *H02P 1/54* (2013.01); *H02P 1/58* (2013.01); *H02P 5/74* (2013.01); *H02P 27/00* (2013.01); *H02P 27/04* (2013.01); *H02P 27/06* (2013.01); *F04B 35/04* (2013.01); *F04B 41/00* (2013.01); *F04B 2203/0202* (2013.01); *F04B 2203/0209* (2013.01); *F04C 2240/81* (2013.01); *F04C 2270/05* (2013.01); *F04C 2270/051* (2013.01); *F04C 2270/10* (2013.01); *F04C 2270/105* (2013.01); *F25B 2600/025* (2013.01); *F25B 2600/0253* (2013.01); *H02P 27/16* (2013.01)

(58) Field of Classification Search
CPC .......... H02P 27/06; F04B 35/04; F04B 41/00; F04B 49/065; F04B 2203/0209; F04B 49/20; F04B 49/06; F04B 49/02; F04B 2203/0202; H01F 30/04; H01F 30/14; F25B 49/025; F25B 2600/0253; F25B 49/022; F25B 2600/025; F04C 28/08; F04C 28/02; F04C 28/06; F04C 2270/05; F04C 2270/051; F04C 2240/81; F04C 2270/10; F04C 2270/105; F04D 25/06; F04D 27/0261; F04D 15/0066; F04D 27/004

See application file for complete search history.

(56) References Cited

U.S. PATENT DOCUMENTS

| | | | |
|---|---|---|---|
| 7,687,929 B2 | 3/2010 | Fattal | |
| 8,014,110 B2 | 9/2011 | Schnetzka et al. | |
| 8,134,323 B2 | 3/2012 | Leung et al. | |
| 9,018,882 B2 | 4/2015 | Mack et al. | |
| 2007/0283708 A1 | 12/2007 | Schnetzka et al. | |
| 2008/0174257 A1* | 7/2008 | Schnetzka | H02M 1/12 318/434 |
| 2014/0075982 A1* | 3/2014 | Norbeck | H02P 1/28 62/498 |
| 2015/0084553 A1* | 3/2015 | Farr | H02P 1/54 318/101 |
| 2016/0248363 A1* | 8/2016 | Wu | H02P 27/047 |

FOREIGN PATENT DOCUMENTS

| | | |
|---|---|---|
| CN | 103178773 A | 6/2013 |
| CN | 103765011 A | 4/2014 |
| CN | 104220822 A | 12/2014 |
| CN | 104329281 A | 2/2015 |
| CN | 105191095 A | 12/2015 |
| EP | 2621077 A2 | 7/2013 |
| KR | 20080089610 A | 10/2008 |
| KR | 20100075773 A | 7/2010 |
| TW | 201141028 A | 11/2011 |
| WO | 0048303 A1 | 8/2000 |

OTHER PUBLICATIONS

Korean Notice of Allowance for KR Application No. 10-2019-7012700 dated Mar. 12, 2021, 3 pgs.
International Search Report and Written Opinion for PCT Application No. PCT/US2017/055365 dated Dec. 21, 2017, 17 pgs.
Chinese Office Action for CN Application No. 201780061304.0 dated Jun. 24, 2020, 9 pgs.
Korean Office Action for KR Application No. 10-2019-7012700 dated Sep. 11, 2020, 8 pg.

* cited by examiner

VARIABLE SPEED DRIVE WITH SECONDARY WINDINGS

CROSS REFERENCE TO RELATED APPLICATIONS

This application claims priority from and the benefit of U.S. Provisional Application Ser. No. 62/404,644, filed Oct. 5, 2016, entitled "VARIABLE SPEED DRIVE WITH SECONDARY WINDINGS," which is hereby incorporated by reference in its entirety for all purposes.

BACKGROUND

The application generally relates to variable speed drives, and more specifically to variable speed drives for medium voltage applications, with an additional secondary transformer winding for synchronously switching the motor load.

Chiller systems for applications in commercial or industrial building heating, ventilating, air conditioning, and refrigeration (HVAC&R) systems typically include relatively large electric motors for powering a compressor. The motors may range in horsepower from 100 horsepower (HP) up to 5,000 HP or larger. Many of these systems include variable speed drives (VSD) for controlling the speed of the motor in response to cooling demand. Motors and VSDs of this size maybe be designed for a wide range of main distribution voltages. In the case where low voltage mains (600 volts or less) are supplied to the chiller system, higher current capacity may be used. To use the relatively high current load, bulky and expensive cables, step-down transformers, and switchgear may be employed. Conversely, where the voltage main supplies medium or high voltage (greater than 600 volts) to the chiller system, the current capacity may be low relative to the low voltage mains.

Currently, VSDs in medium voltage systems that use transformers have an internal step down transformer. The VSD may accelerate the compressor motor of the chiller system to reach a threshold speed and switch a power source of the motor from a fixed voltage source to an alternate fixed-speed source provided by an external step down transformer. Unfortunately, the external step down transformer may utilize external wiring and other components that may increase costs and/or a footprint of the chiller system as a whole.

SUMMARY

In one embodiment, a refrigeration system includes a compressor configured to circulate refrigerant along a refrigerant loop, a motor configured to drive the compressor, and a variable speed drive coupled to the motor and configured to supply power to the motor. The variable speed drive includes a primary winding of a step down transformer coupled to an alternating current (AC) power source, a first secondary winding of the step down transformer, where the first secondary winding is configured to supply power at a variable supplied voltage to the motor when the motor operates below a threshold voltage, and a second secondary winding of the step down transformer, where the second secondary winding is configured to supply power at a fixed supplied voltage when the motor operates at or above the threshold voltage.

In another embodiment, a system includes a variable speed drive coupled to a motor and configured to supply power to the motor, wherein the variable speed drive includes a primary winding of a step down transformer coupled to an alternating current (AC) power source, a first secondary winding of the step down transformer, where the first secondary winding is configured to supply power at a variable supplied voltage to the motor when the motor operates below a threshold voltage, a second secondary winding of the step down transformer, where the second secondary winding is configured to supply power at a fixed supplied voltage when the motor operates at or above the threshold voltage, and a controller configured to selectively establish electrical communication between the motor and the first secondary winding and the motor and the second secondary winding based on a measured voltage of the motor.

In still another embodiment, a method includes monitoring a voltage demand of a motor, where a variable speed drive is coupled to the motor and configured to supply power to the motor, supplying a first power to the motor from a first secondary winding of the variable speed drive when the voltage demand of the motor is below a threshold, where the first power comprises a variable voltage, and supplying a second power to the motor from a second secondary winding of the variable speed drive when the voltage demand of the motor is at or above the threshold, where the second power comprises a constant voltage, and where the second secondary winding is integral with the variable speed drive.

DETAILED DESCRIPTION

Figure 1:
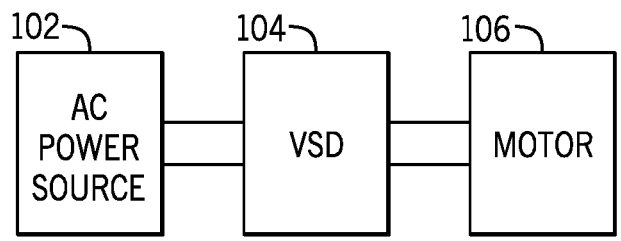
FIG. 1 is a schematic of an embodiment of a general configuration of a variable speed drive configured to power a motor, in accordance with an aspect of the present disclosure.

A chiller system may include a control system coupled to a variable speed drive (VSD). The control system may accelerate a motor configured to drive a compressor of the chiller system from zero revolutions per minute (RPM) to a threshold speed. At the threshold speed, the control system may be configured to instruct the compressor motor to bypass the VSD and operate directly from a second transformer at a set point output voltage. In typical chiller systems, the control system and/or the VSD may include a transfer switch that couples the VSD to an alternate step down transformer external to the VSD. However, in embodiments of the present disclosure, an additional secondary transformer winding is included internal to the VSD drive transformer, thereby enabling the compressor motor to switch to the additional secondary transformer winding (e.g., an internal fixed voltage source) without a separate, external transformer that may include additional wiring and/or associated switchgear.

In some embodiments, a VSD may include a step down transformer, a rectifier, a direct current (DC) link, and/or an inverter. The step down transformer includes a primary winding for receiving a medium voltage input (e.g., a voltage up to about 15 kV) at a frequency of an alternating current (AC) power source. A first secondary winding may provide power to the rectifier, the DC link, and/or the inverter. Further, a second secondary winding may be connected to output terminals of the VSD for threshold speed applications. The first secondary winding and the second secondary winding (e.g., threshold speed secondary winding) may be magnetically coupled to the primary winding. The first secondary winding may provide power to the rectifier, the DC link, and the inverter, such that the VSD produces an AC voltage output having a variable amplitude voltage that is less than a set point voltage applied to the primary winding (e.g., approximately 15 kV) and a frequency less than or equal to a frequency of the AC power source. The second secondary winding (e.g., the threshold speed secondary winding, or bypass secondary winding) may be connected to the output terminals of the VSD and produce a fixed voltage and frequency. The output terminals of the VSD may also be coupled to a set of contacts at an input to a motor, such that the second secondary winding may be coupled to the motor. Additional output terminals of the VSD coupled to the rectifier, the DC link, and/or the inverter may be connected to an additional set of contacts at an input to the motor, thereby coupling the first secondary winding to the motor.

The VSD may be utilized in a chiller system that includes a refrigerant circuit. The refrigerant circuit may include a compressor (e.g., driven by the one or more motors), a condenser, and an evaporator connected in a closed refrigerant loop. The VSD is configured to power the compressor motor. The output terminals of the rectifiers, DC link, and inverters are connected to a first set of contacts to drive at least one motor in an industrial process, such as a chiller, an HVAC system, a waste water, or oil pumping station, and the output terminals of the second secondary winding are connected to a second set of contacts as an input to the same industrial process or system. In addition to refrigeration systems, chillers and other heating, ventilating, air conditioning, and refrigeration (HVAC&R) applications, the present disclosure may be applied to any application in which medium voltage drives are used, including but not limited to waste-water treatment or oil-platform applications. The examples set forth below are exemplary only, and are not intended to limit the scope of the claims in any way.

Embodiments of the present disclosure add a second secondary transformer winding to the VSD drive transformer to enable the power source for the motor to switch from an internal alternating voltage source to an internal fixed voltage source. Thus, embodiments of the present disclosure eliminate an external transformer that may provide a fixed voltage as well as the wiring and switchgear associated with such external transformer, thereby reducing costs of the system. The present disclosure further reduces electrical losses associated with the VSD drive when providing power to a motor running at threshold speed conditions where constant load voltage and frequency are utilized, thereby increasing efficiency of the system. Alternative embodiments relate to other features and combinations of features as may be generally recited in the claims.

Figure 2:
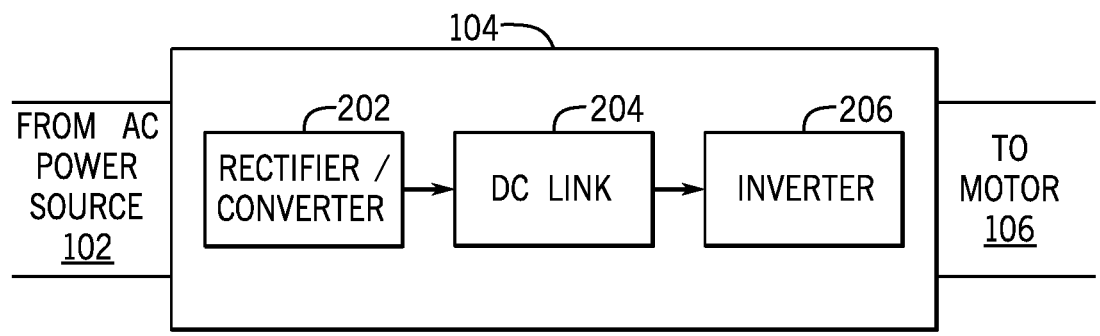
FIG. 2 is a schematic of an embodiment of the variable speed drive of FIG. 1, in accordance with an aspect of the present disclosure.

FIGS. 1 and 2 illustrate generally an embodiment of a system configuration, in accordance with an aspect of the present disclosure. An alternating current (AC) power source 102 supplies AC power to a variable speed drive (VSD) 104, which in turn, supplies AC power to a motor 106. In some embodiments, the motor 106 is used to drive a corresponding compressor of a refrigeration or chiller system. The AC power source 102 provides three-phase, fixed voltage, and fixed frequency AC power to the VSD 104 from an AC power grid or distribution system that is present near the system. The AC power grid can be supplied directly from an electric utility or can be supplied from one or more transforming substations between the electric utility and the AC power grid. In some embodiments, the AC power source 102 may supply a three phase AC voltage, or line voltage, of up to 15 kilovolts (kV) at a line frequency of between 50 Hertz (Hz) and 60 Hz to the VSD 104, depending on the corresponding AC power grid. However, in other embodiments, the AC power source 102 can provide any suitable fixed line voltage or fixed line frequency to the VSD 104 based on the configuration of the AC power grid. In addition, a particular site can have multiple AC power grids that can satisfy different line voltage and line frequency demands.

Referring to FIG. 2, the VSD 104 receives AC power having a particular fixed line voltage and fixed line frequency from the AC power source 102. The VSD 104 may also provide AC power to the motor 106 at a desired voltage and a desired frequency, both of which can be varied to satisfy predetermined set points of the motor 106. In certain embodiments, the VSD 104 may provide AC power to the motor 106 having higher voltages and frequencies or lower voltages and frequencies than the fixed voltage and fixed frequency received from the AC power source 102. For example, FIG. 2 illustrates schematically components that may be included in an embodiment of the VSD 104. As shown in the illustrated embodiment of FIG. 2, the VSD 104 can have three stages: a converter 202 (e.g., rectifier), a direct current (DC) link 204, and an inverter 206. The converter 202 may convert the fixed line frequency and/or the fixed line voltage from the AC power source 102 into DC power. The DC link 204 may filter the DC power from the converter 202 and/or store energy by utilizing components such as capacitors and/or inductors (not shown). The inverter 206 may convert the DC power from the DC link 204 back into variable frequency, variable voltage AC power, which is supplied to the motor 106.

In some embodiments, the converter 202 may be a pulse width modulated (PWM) boost converter or rectifier having insulated gate bipolar transistors (IGBTs) to provide a boosted DC voltage to the DC link 204 and produce a threshold fundamental root mean square (RMS) output voltage from the VSD 104 that is greater than a fixed nominal fundamental RMS input voltage to the VSD 104. In certain embodiments, the VSD 104 may provide a threshold output voltage that is greater than the fixed nominal fundamental RMS input voltage provided to the VSD 104 and a threshold fundamental RMS output frequency that is greater than the fixed input frequency provided to the VSD 104. Furthermore, in some embodiments, the VSD 104 may incorporate additional components from those shown in FIG. 2 to provide the motor 106 with appropriate output voltages and frequencies.

Figure 3:
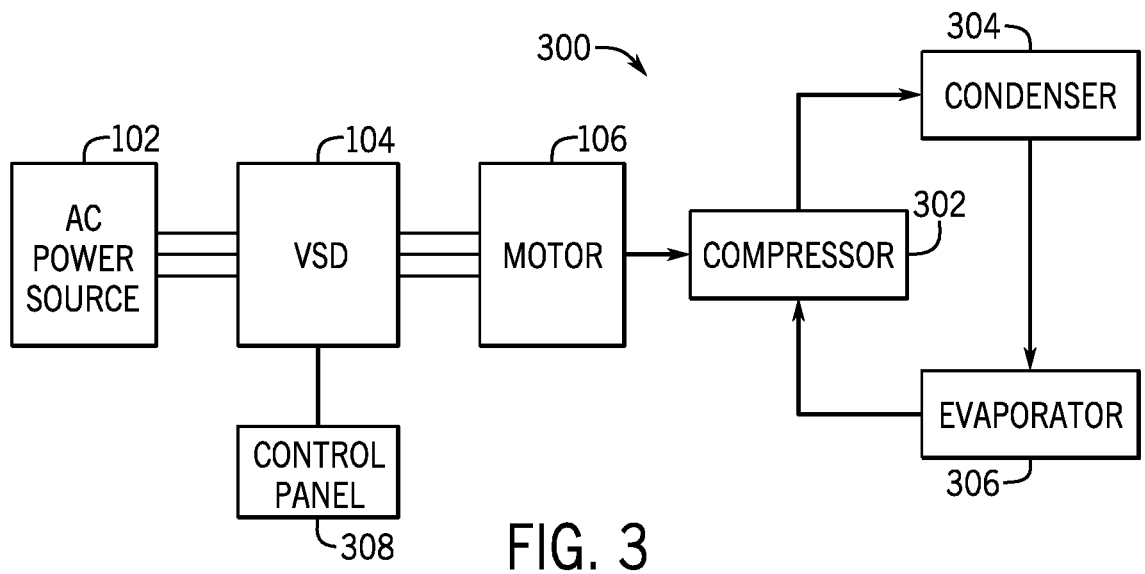
FIG. 3 is a schematic of an embodiment of a refrigeration system that includes a compressor that may be powered by the motor and/or variable speed drive of FIG. 1, in accordance with an aspect of the present disclosure.

In some embodiments, the motor 106 may be an induction motor that is capable of being driven at variable speeds. The induction motor can have any suitable pole arrangement including two poles, four poles, six poles, or any suitable number of poles. The induction motor is used to drive a load, such as a compressor of a refrigeration or chiller system as shown in FIG. 3. FIG. 3 illustrates generally the system of the present disclosure coupled to a refrigeration system 300. While FIG. 3 illustrates the system coupled to a refrigeration system 300, it should be understood that the embodiments of the present disclosure may be applied to a variety of systems, such as waste water treatment plants and/or pumping stations for oil and gas applications. Thus, FIG. 3 is not intended to limit the application of the system described in the present disclosure.

As shown in FIG. 3, a HVAC&R or liquid chiller system 300 includes a compressor 302, a condenser 304, an evaporator 306, and a control system 308. The control system 308 can include a variety of different components such as an analog to digital (A/D) converter, a microprocessor, a nonvolatile memory, and/or an interface board to control operation of the refrigeration system 300. The control system 308 can also be used to control operation of the VSD 104 and/or the motor 106.

Compressor 302 compresses a refrigerant vapor and delivers the vapor to the condenser 304 through a discharge line. The compressor 302 is preferably a centrifugal compressor, but can be any suitable type of compressor (e.g., screw compressor, reciprocating compressor, etc.). The refrigerant vapor delivered by the compressor 302 to the condenser 304 enters into a heat exchange relationship with a cooling fluid (e.g., air or water) and undergoes a phase change to a refrigerant liquid as a result of the heat exchange relationship with the cooling fluid. In some embodiments, the condensed liquid refrigerant flowing from the condenser 304 flows through an expansion device (not shown) to the evaporator 306.

The evaporator 306 may include connections for a supply line and a return line of a heating fluid. For example, the heating fluid (e.g., water, ethylene, calcium chloride brine or sodium chloride brine) may travel into the evaporator 306 via a return line and exit the evaporator 306 via a supply line. The liquid refrigerant in the evaporator 306 enters into a heat exchange relationship with the heating fluid to lower a temperature of the heating fluid and increase a temperature of the liquid refrigerant. Accordingly, the liquid refrigerant in the evaporator 306 undergoes a phase change to a vapor refrigerant as a result of the heat exchange relationship with the heating fluid. The vapor refrigerant in the evaporator 306 exits the evaporator 306 and returns to the compressor 302 by a suction line to complete the cycle. It is to be understood that any suitable configuration of the condenser 304 and the evaporator 306 can be used in the system 300, provided that the appropriate phase change of the refrigerant in the condenser 304 and the evaporator 306 is obtained.

In some embodiments, the HVAC&R or liquid chiller system 300 may include additional components and/or features not shown in FIG. 3. Furthermore, while FIG. 3 illustrates the HVAC&R or liquid chiller system 300 as having one compressor connected in a single refrigerant circuit, the system 300 may include multiple compressors, powered by a single VSD or multiple VSDs, connected into each of one or more refrigerant circuits.

In certain embodiments, the control system 308, may provide control signals to the VSD 104 to control the operation of the VSD 104 (and/or the motor 106) and provide operational set points for the VSD 104 and/or the motor 106 based on feedback received from one or more sensors of the HVAC&R or liquid chiller system 300. For example, in the HVAC&R or liquid chiller system 300 of FIG. 3, the control system 308 may adjust a magnitude of the AC output voltage and/or a frequency of the AC voltage provided by the VSD 104 to the motor 106 based on one or more operating conditions of the HVAC&R or liquid chiller system 300 to adjust operating parameters of the system 300. As a non-limiting example, the control system 308 may adjust the output voltage and frequency of the VSD 104 based on detected load conditions of the compressor 302 to obtain a desired operating speed of the motor 106, and thus, a desired load output of the compressor 302.

Figure 4:
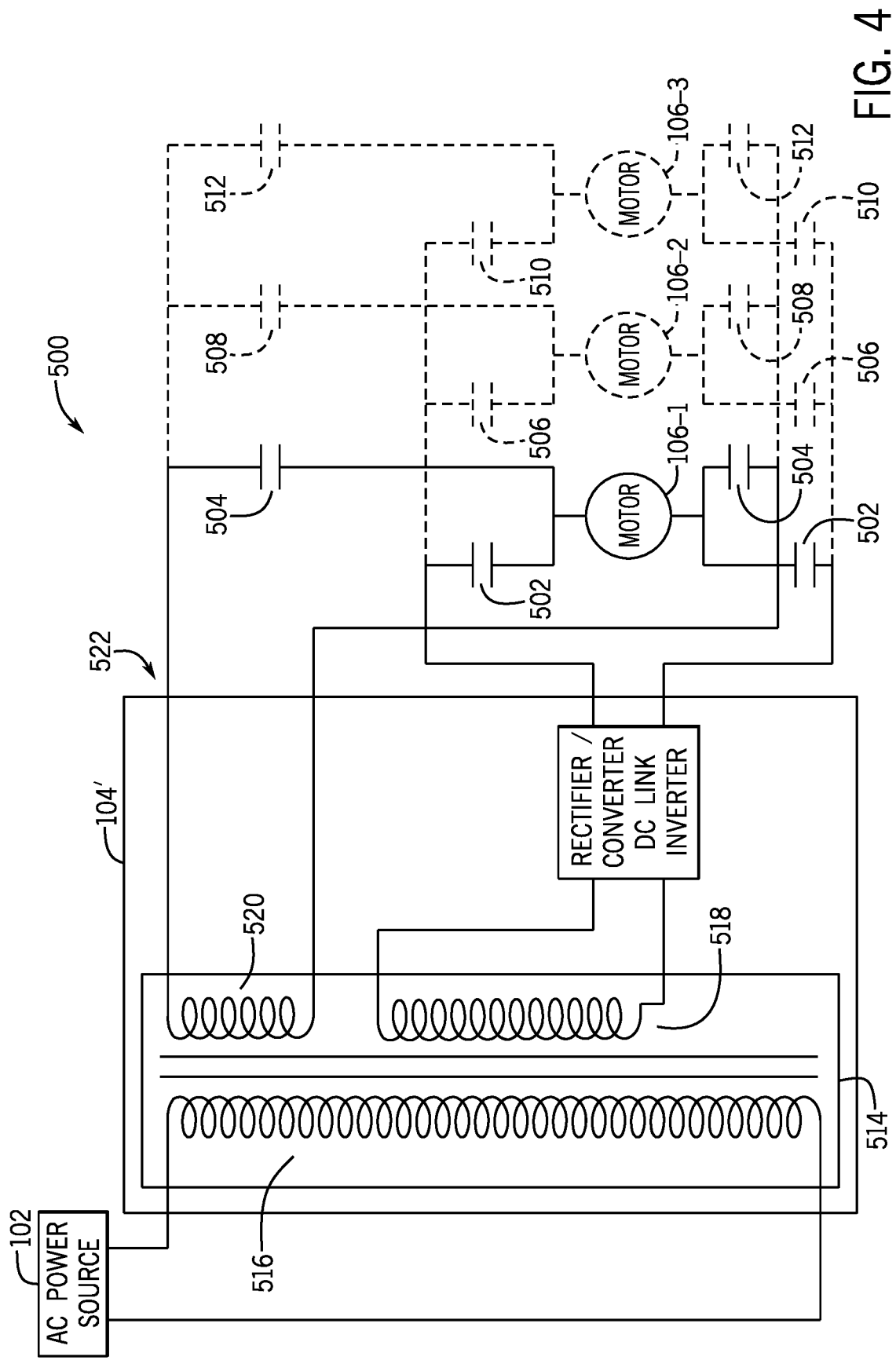
FIG. 4 is a schematic of an embodiment of circuitry of the variable speed drive of FIG. 1 that may include a second secondary winding, in accordance with an aspect of the present disclosure.

FIG. 4 shows an embodiment of enhanced circuitry 500 of a VSD 104', in accordance with an aspect of the present disclosure. The circuitry 500 may be configured to control the VSD 104', which may in turn accelerate the motor 106, from an inactive state to a set point voltage and set point frequency by controlling the rectifier 202, the DC link 204, and the inverter 206. The rectifier 202, the DC link 204, and/or the inverter 206 may adjust the voltage and frequency of the input power to reach the set point voltage and the set point frequency based on a load demand of the motor 106, for example. When the power out from the VSD 104' reaches a threshold voltage and a threshold speed of the motor 106 is desired, power directed to the motor 106 may bypass the VSD 104' using one or more pairs of contacts or transfer switches 502, 504, 506, 508, 510, and/or 512. The motor 106 then receives power from a second secondary winding 520 at the threshold output voltage and a threshold frequency of the AC power source 102.

As shown in the illustrated embodiment of FIG. 4, the VSD 104' is provided with a step down transformer 514 with a primary winding 516, a first secondary winding 518, and the second secondary winding 520. In some embodiments, the primary winding 516 may be rated up to 15 kV. Additionally, the second secondary winding 520 may be rated at a fixed speed mains voltage rating of the motors 106 (e.g., 2300V, 3300 V, 4160 V, or another suitable fixed speed mains voltage rating). As discussed above, input/output voltages and associated parameters may change according to utility source voltage and motor ratings. In any case, the first secondary winding 518 may be configured to input power to the rectifier 202, the DC link 204, and the inverter 206. In certain embodiments, the control system 308 controls the rectifier 202, the DC link 204, and/or the inverter 206 to vary the voltage and frequency of the power input to motors 106 (and output by the VSD 104') over a predetermined range of voltage and frequency (e.g., based on a load demand by chiller system 300). In certain embodiments, more than one of the motors 106 may be coupled to the VSD 104'. For example, FIG. 4 illustrates a multiple motor process (e.g., HVAC&R, chiller, waste water pumping, or oil pumping application) that includes three motors 106-1, 106-2, and 106-3 that may be separately coupled to the VSD 104' via a second output 522 of the VSD 104'. The second output 522 may be coupled to the rectifier 202, the DC link 204, and/or the inverter 206 and may direct the variable voltage and variable frequency to a pair of contacts 502, 504, 506, 508, 510, and/or 512 associated with each motor 106.

In some embodiments, both the first secondary winding 518 and the second secondary winding 520 may be rated to provide sufficient power to operate one or more of the motors 106 at a threshold load. In some embodiments, a first motor 106-1 is coupled to the second output 522 of the VSD 104' through contacts 502 and 504 associated with the motor 106-1. When the control system 308 adjusts the rectifier 202, the DC link 204, and/or the inverter 206 to operate the motor 106-1 at a threshold voltage, power supplied to the motor 106-1 may be transferred from the first secondary winding 518 to the second secondary winding 520. In certain embodiments, the power output by the second secondary winding 520 may not include variable voltage or frequency control, because the threshold voltage of the motor 106-1 may be at a constant voltage and frequency. When the power supplied to the motor 106-1 is transferred to the second secondary winding 520, the VSD 104' may be used to drive a second motor 106-2. When the control system 308 adjusts the rectifier 202, the DC link 204, and/or the inverter 206 to operate the motor 106-2 at a threshold voltage, power supplied to the motor 106-2 may be transferred from the first secondary winding 518 to the second secondary winding 520. Accordingly, power may be supplied to both the first and second motors 106-1 and 106-2 from the second secondary winding 520. In some embodiments, synchronously transferring power supply to the first and the second motors 106-1 and 106-2 from the first secondary winding 518 to the second secondary winding 520 may substantially reduce operating faults cause by such transfers.

As shown in the illustrated embodiment of FIG. 4, multiple motors can be coupled to the VSD 104'. For example, FIG. 4 illustrates the enhanced circuitry 500 of the VSD 104' being utilized to power three motors, 106-1, 106-2, and 106-3, which may be separately coupled to the VSD 104'. Although the transformer 514, the VSD 104', and the motors 106 are illustrated as a single phase circuit, a person skilled in the art would understand how to implement the circuitry 500 in a three phase circuit.

In some embodiments, the contacts 502, 504, 506, 508, 510, and/or 512 may initially be in an open state when the motors 106 are inactive (e.g., not operating). To start the first motor 106-1, the contacts 502 may be closed to couple the first motor 106-1 to the VSD 104'. The amplitude of the applied AC voltage produced by VSD 104' may be increased from substantially zero to the voltage rating of the motor 106-1 and the frequency of the applied AC voltage is increased from substantially zero to the frequency of the AC power source 102. When the first motor 106-1 is operating at full load (e.g., at a threshold voltage), power supplied to the first motor 106-1 may be transferred from the first secondary winding 518 to the second secondary winding 520 of the transformer 514 by opening contacts 502 and closing contacts 504. Accordingly, the first motor 106-1 receives power for continued operation from the second secondary winding 520 through closed contacts 504.

When the contacts 502 are in the open state and the voltage and frequency of the VSD 104' reach substantially zero, the VSD 104' has substantially no load and may be used to start the second motor 106-2. The second motor 106-2 is started by closing the contacts 506 that couple the motor 106-2 to the VSD 104'. The amplitude of the applied AC voltage produced by the VSD 104' may be increased from substantially zero to the voltage rating of the second motor 106-2 and the frequency of the applied AC voltage may be increased from substantially zero to the frequency of the AC power source 102. When the second motor 106-2 is operating at full load (e.g., at a threshold voltage), power supplied to the second motor 106-2 may be transferred from the first secondary winding 518 to the second secondary winding 520 of the transformer 514 by opening the contacts 506 and closing the contacts 508. Accordingly, the second motor 106-2 receives power for continued operation from the second secondary winding 520 through closed contacts 508.

When the contacts 502 and 506 are in the open state and the voltage and frequency of the VSD' 104 reach substantially zero, the VSD' 104 has substantially no load and may be used to start the third motor 106-3. The third motor 106-3 is started by closing the contacts 510 that couple the third motor 106-3 to the VSD 104'. The amplitude of the applied AC voltage produced by the VSD 104' may be increased from substantially zero to the voltage rating of the third motor 106-3 and the frequency of the applied AC voltage may be increased from substantially zero to the frequency of the AC power source 102. When the third motor 106-3 is operating at full load (e.g., at a threshold voltage) power supplied to the third motor 106-3 may be transferred from the first secondary winding 518 to the second secondary winding 520 of the transformer 514 by opening the contacts 510 and closing the contacts 512. Accordingly, the third motor 106-3 receives power for continued operation from the second secondary winding 520 through the closed contacts 512.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the medium voltage synchronous transfer system as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. We claim all patentable subject matter disclosed herein.

The invention claimed is:

1. A refrigeration system, comprising:
a compressor configured to circulate refrigerant through a refrigerant loop;
a motor configured to drive the compressor; and
a variable speed drive coupled to the motor and configured to supply power to the motor, wherein the variable speed drive comprises:
a primary winding of a step down transformer coupled to an alternating current (AC) power source;
a first secondary winding of the step down transformer, wherein the first secondary winding is configured to supply power to the motor at a variable supplied voltage to operate the motor below a threshold voltage; and
a second secondary winding of the step down transformer, wherein the second secondary winding is configured to supply power to the motor at a fixed supplied voltage to operate the motor at or above the threshold voltage.

2. The refrigeration system of claim 1, wherein the variable speed drive comprises:
a rectifier coupled to the first secondary winding, wherein the rectifier is configured to convert a fixed voltage from the AC power source into direct current (DC) power;
a DC link coupled to the first secondary winding, wherein the DC link is configured to filter the DC power from the rectifier, or store the DC power from the rectifier, or both; and
an inverter coupled to the first secondary winding, wherein the inverter is configured to convert the DC power from the DC link into variable voltage AC power and supply the variable voltage AC power to the motor.

3. The refrigeration system of claim 1, wherein the second secondary winding is rated for a fixed speed mains voltage rating of the motor.

4. The refrigeration system of claim 1, wherein the primary winding is rated for up to 15,000 Volts (V).

5. The refrigeration system of claim 1, comprising:
a condenser disposed along the refrigerant loop, wherein the condenser is configured to receive refrigerant from the compressor and place the refrigerant in a first heat exchange relationship with a cooling fluid, such that the refrigerant condenses to a liquid refrigerant; and
an evaporator disposed along the refrigerant loop, wherein the evaporator is configured to receive the liquid refrigerant from the condenser and place the liquid refrigerant in a second heat exchange relationship with a heating fluid, such that the liquid refrigerant evaporates into a vapor refrigerant.

6. The refrigeration system of claim 1, wherein the primary winding is coupled to a three-phase AC power source.

7. The refrigeration system of claim 6, wherein the three-phase AC power source supplies power having up to 15 kilovolts (kV) and a frequency between 50 Hertz (Hz) and 60 Hz.

8. The refrigeration system of claim 1, comprising:
a first circuit comprising the first secondary winding, the motor, and a first switch;
a second circuit comprising the second secondary winding, the motor, and a second switch; and
a controller communicatively coupled to the first switch of the first circuit and the second switch of the second circuit.

9. The refrigeration system of claim 8, wherein the controller is configured to close the first switch and open the second switch when the motor operates below the threshold voltage, and wherein the controller is configured to open the first switch and close the second switch when the motor operates at or above the threshold voltage.

10. A system, comprising:
a variable speed drive coupled to a motor and configured to supply power to the motor, wherein the variable speed drive comprises:
a primary winding of a step down transformer coupled to an alternating current (AC) power source;
a first secondary winding of the step down transformer, wherein the first secondary winding is configured to supply power to the motor at a variable supplied voltage to operate the motor below a threshold voltage; and
a second secondary winding of the step down transformer, wherein the second secondary winding is configured to supply power to the motor at a fixed supplied voltage to operate the motor at or above the threshold voltage; and
a controller configured to selectively establish electrical communication between the motor and the first secondary winding and between the motor and the second secondary winding based on a measured voltage of the motor.

11. The system of claim 10, wherein the variable speed drive comprises:
a rectifier coupled to the first secondary winding, wherein the rectifier is configured to convert a fixed voltage from the AC power source into direct current (DC) power;
a DC link coupled to the first secondary winding, wherein the DC link is configured to filter the DC power from the rectifier, store the DC power from the rectifier, or a combination thereof; and
an inverter coupled to the first secondary winding, wherein the inverter is configured to convert the DC power from the DC link into variable voltage AC power and supply the variable voltage AC power to the motor.

12. The system of claim 11, comprising:
a first circuit comprising the first secondary winding, the rectifier, the DC link, the inverter, the motor, and a first switch; and
a second circuit comprising the second secondary winding, the motor, and a second switch.

13. The system of claim 12, wherein the controller is electrically coupled to the first switch of the first circuit and the second switch of the second circuit, wherein the controller is configured to close the first switch and open the second switch when the measured voltage of the motor is below the threshold voltage, and wherein the controller is configured to open the first switch and close the second switch when the measured voltage of the motor is at or above the threshold voltage.

14. The system of claim 10, comprising the motor and an additional motor, wherein the variable speed drive is coupled to the additional motor and is configured to supply power to the additional motor.

15. The system of claim 14, wherein the controller is configured to establish an electrical connection between the additional motor and the first secondary winding when an electrical connection between the motor and the second secondary winding is established.

16. The system of claim 10, wherein the second secondary winding is rated for 4160 Volts (V).

17. A method, comprising:
monitoring a voltage demand of a motor, wherein a variable speed drive is coupled to the motor and configured to supply power to the motor;
supplying a first power to the motor from a first secondary winding of the variable speed drive to operate the motor based on the voltage demand of the motor being below a threshold, wherein the first power comprises a variable voltage; and
supplying a second power to the motor from a second secondary winding of the variable speed drive to operate the motor based on the voltage demand of the motor being at or above the threshold, wherein the second power comprises a constant voltage, and wherein the second secondary winding is integral with the variable speed drive.

18. The method of claim 17, comprising switching from the first power to the second power when the voltage demand of the motor reaches the threshold.

19. The method of claim 18, wherein switching from the first power to the second power comprises opening a first switch of a first circuit and closing a second switch of a second circuit when the voltage demand of the motor reaches the threshold, wherein the first circuit comprises the first secondary winding, the motor, and the first switch, and wherein the second circuit comprises the second secondary winding, the motor, and the second switch.

20. The method of claim 17, comprising:
monitoring an additional voltage demand of an additional motor, wherein the variable speed drive is coupled to the additional motor and configured to supply power to the additional motor;
supplying a third power to the additional motor from the first secondary winding of the variable speed drive when the additional voltage demand of the additional motor is below an additional threshold and when the second power is supplied to the motor from the second secondary winding; and
supplying a fourth power to the additional motor from the second secondary winding of the variable speed drive when the additional voltage demand of the additional motor is at or above the additional threshold.

* * * * *